May 31, 1927.

W. H. SCOTT 1,630,543

RECEPTACLE FILLING AND DRAINING DEVICE

Filed July 27, 1925

INVENTOR.
William H. Scott.
BY
his ATTORNEYS.

Patented May 31, 1927.

1,630,543

UNITED STATES PATENT OFFICE.

WILLIAM H. SCOTT, OF ROCHESTER, NEW YORK.

RECEPTACLE FILLING AND DRAINING DEVICE.

Application filed July 27, 1925. Serial No. 46,206.

The present invention relates to receptacle filling and draining devices and an object of the invention is to provide a construction which is simple in operation, inexpensive to manufacture and durable in use. A further object of the invention is to provide a construction which will require a minimum amount of tubing or hose in order to produce the results. A still further object of the invention is to provide an improved form of ejector.

To these and other ends, the invention consists of certain parts and combinations of parts, all of which will be hereinafter described, the novel features being pointed out in the appended claims.

Figure 1:
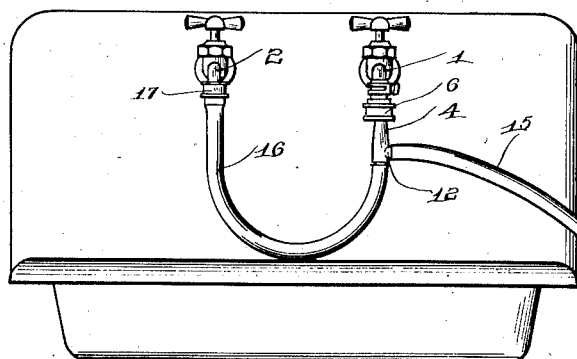
Fig. 1 is a view showing the device used for filling a receptacle.

Referring more particularly to the drawing, 1 indicates a cold water supply and 2 a hot water supply, whereas 3 indicates a receptacle or tub to be filled or drained. In the illustrated embodiment of the invention, there is provided an ejector comprising a substantially T shaped member provided with an arm 4 which has a cylindrical bore and has a reduced portion 5 near one end. On this reduced portion 5 is fitted to turn a coupling member 6 internally threaded at 7 for engagement with the threads on one of the faucets 1 or 2 preferably the cold water faucet 1. This coupling member 6 is held in position by the outwardly extending flange 8 on the end of a tubular member 9 which fits the cylindrical bore of the arm 4 and has its inner end closed by a wall 10 which has an orifice 11 adjacent the lateral arm 12 of the ejector. In line with the arm 4, the ejector has the arm 13 which has a restricted portion 14 of less internal diameter than the internal diameter of the arm 12 and in line with the orifice 11. A tube 15 is connected with the arm 12 while a tube 16 is connected with the arm 13, this tube 16 having at its free end a coupling member 17 which is held rotatably in place on the hose by the flange 18 on the end of a tube 19 fitted in the hose 16. This coupling member 17 serves for attachment to the hot water faucet 2, as shown in Fig. 1.

Figure 2:
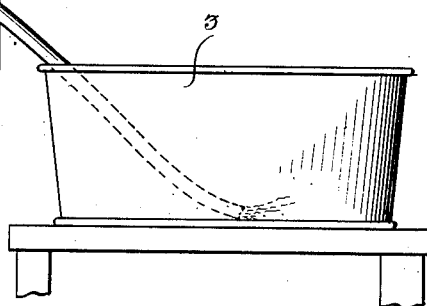
Fig. 2 is a similar view showing the device adjusted to drain the receptacle.
Figure 2:
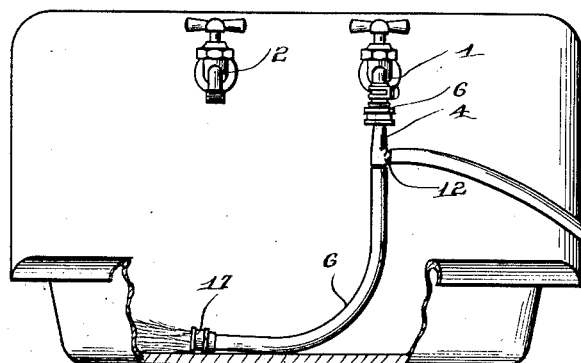
Figure 3:
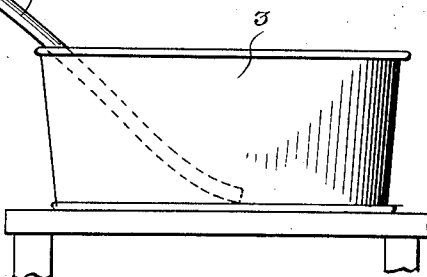
Fig. 3 is a sectional view through the ejector.
Figure 3:
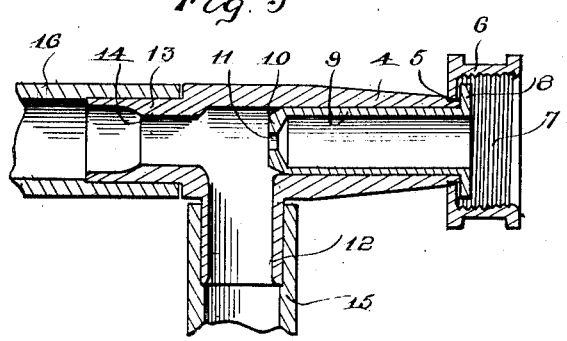
Figure 4:
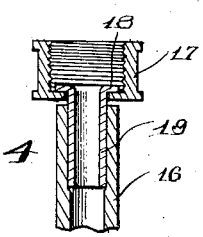
Fig. 4 is a sectional view through one end of one of the tubes.

When it is desired to fill the tub or receptacle 3 with both hot and cold water, the coupling members 6 and 17 are connected respectively to the faucets 1 and 2, while the hose 15 leads into the receptacle 3 as shown in Fig. 2. The tub is supplied with water by turning on either or both faucets 1 and 2. When it is desired to drain the receptacle or tub 3, the coupling member 17 is disconnected from the faucet 2 and permitted to drop to the position shown in Fig. 2. With the turning on of the faucet 1, water will issue from the orifice 11 past the inner end of the arm 12 and create a partial vacuum in the tube 15 which will cause the water in the receptacle 3 to pass into the tube and be discharged through the tube 16.

What I claim as my invention and desire to secure by Letters Patent is:

1. A receptacle filling and draining device comprising an ejector having three arms, two of which are aligned, a coupling device on one of said aligned arms, and two flexible tubes connected to the other two arms of the said ejector, the tube which is connected to the other aligned arm having a coupling device at its free end and the length of such tube being such that it may be flexed to permit the attachment of the coupling device thereon to a faucet while the first mentioned coupling device is attached to another faucet so that both faucets may supply water to the ejector for filling a receptacle and the said tube having the coupling device being detachable from its faucet when the receptacle is to be drained.

2. A receptacle filling and draining device including an ejector comprising an upper tubular faucet attaching arm, a lower tubular discharge arm, and a lateral tubular intake arm at the juncture of the said arms, the faucet attaching arm being provided at its lower end with a closure wall having a jet aperture and extending across the faucet attaching arm at the top of the juncture of the other two arms, and the latter being unobstructed to permit a free flow of water through them, the bore or passage of the lower arm being restricted at its upper end and flared downwardly below the juncture of the said lower and laterally extending arms, flexible tubes connected to the lower and laterally extending arms, and means for coupling the ejector and one of the said tubes to a pair of faucets.

3. An ejector of the class described comprising a tubular T-shaped member, the two aligned arms of which form a faucet attaching arm and a discharge arm while the lateral arm forms an intake arm, said member having a cylindrical bore extending throughout the length of the faucet attaching arm and the intake arm, the passage of the discharge arm being restricted adjacent its intake end and flared outwardly beyond the same, and a tubular member having a cylindrical exterior throughout the greater portion of its length and fitting and extending the entire length of the faucet attaching arm and provided at its inner end with an end wall located at one side of the bore of the intake arm and extending across the faucet attaching arm and provided with a restricted opening forming a jet aperture disposed opposite the restricted end of the bore of the discharging arm.

WILLIAM H. SCOTT.